United States Patent
Aoyama

(10) Patent No.: US 7,421,884 B2
(45) Date of Patent: Sep. 9, 2008

(54) METHOD OF DETERMINING CETANE NUMBER OF FUEL IN INTERNAL COMBUSTION ENGINE

(75) Inventor: Taro Aoyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 317 days.

(21) Appl. No.: 10/575,169

(22) PCT Filed: Jun. 1, 2005

(86) PCT No.: PCT/JP2005/010447

§ 371 (c)(1),
(2), (4) Date: Apr. 10, 2006

(87) PCT Pub. No.: WO2005/119034

PCT Pub. Date: Dec. 15, 2005

(65) Prior Publication Data

US 2007/0079647 A1    Apr. 12, 2007

(30) Foreign Application Priority Data

Jun. 1, 2004    (JP)    ............................. 2004-163299

(51) Int. Cl.
G01N 33/22    (2006.01)

(52) U.S. Cl. ...................................... 73/35.02

(58) Field of Classification Search ....................... None
See application file for complete search history.

(56) References Cited

FOREIGN PATENT DOCUMENTS

| EP | 1 033 479 A2 | 9/2000 |
|---|---|---|
| EP | 1 074 839 A1 | 2/2001 |
| JP | A 64-68659 | 3/1989 |
| JP | U 1-59853 | 4/1989 |
| JP | A 3-105042 | 5/1991 |
| JP | A 2002-201997 | 7/1992 |
| JP | A 5-172699 | 7/1993 |
| JP | A 5-223026 | 8/1993 |
| JP | A 2000-257419 | 9/2000 |
| JP | A 2001-329905 | 11/2001 |

*Primary Examiner*—Robert R Raevis
(74) *Attorney, Agent, or Firm*—Oliff & Berridge, PLC

(57) ABSTRACT

An object of the present invention is to provide a technology that enables to determine the cetane number of fuel in a state in which it is actually used for running an internal combustion engine with an improved degree of accuracy. A fuel injection for cetane number determination in which a specified quantity of fuel is injected into a combustion chamber during a compression stroke or expansion stroke, is performed while the internal combustion engine is in a fuel cut state. The cetane number of the fuel is determined based on the time period from a specified time to a time of ignition at which the fuel injected by the fuel injection for cetane number determination is ignited.

17 Claims, 4 Drawing Sheets

METHOD OF DETERMINING CETANE NUMBER OF FUEL IN INTERNAL COMBUSTION ENGINE

TECHNICAL FIELD

The present invention relates to a method of determining the cetane number of fuel in an internal combustion engine, and more particularly, to a method of determining the cetane number of fuel in a state in which it is actually used for running the internal combustion engine.

PRIOR ART

Ignition characteristics of fuel used for running an internal combustion engine differ depending on the cetane number of the fuel. Therefore, in order to control the burning condition in an internal combustion engine with a higher degree of accuracy to improve the engine output and emission or to reduce combustion noise etc., it is important to control the fuel injection quantity and the fuel injection timing in accordance with the cetane number of the fuel.

For example, Japanese Patent Application Laid-Open NO. 2001-329905 discloses a method of determining the cetane number of fuel, in which an apparatus for analyzing combustion characteristics of fuel is used to burn fuel in a combustion chamber having a constant volume. In this method, the cetane number is determined based on the rate of change in the pressure in the combustion chamber caused when fuel is burned in the combustion chamber.

However, it is practically difficult to always use fuel with a specific cetane number, since the cetane number of fuel used for running an internal combustion engine varies depending on the used state of fuel and upon refueling. Accordingly, it is necessary to determine the cetane number of fuel in a state in which the fuel is actually used for running the internal combustion engine.

A method of determining the cetane number of fuel in a state in which it is actually used for running an internal combustion engine is disclosed, for example, in Japanese Patent Application Laid-Open No. 2000-257419 as a method in which fuel is injected into the combustion chamber at an early stage in a compression stroke. In such a method, as shown in FIG. 4, the cetane number of the fuel is determined based on the pressure difference ΔP between the peak value of the pressure increased by combustion (or cold flame) of the fuel injected at an early stage of a compression stroke and the pressure in the case where the fuel injection at an early stage in a compression stroke is not effected, namely the pressure realized only by upward movement of the piston while combustion does not occur in the combustion chamber. In FIG. 4, the horizontal axis represents the crank angle, and the vertical axis represents the pressure in the cylinder. The solid line in FIG. 4 shows a variation of the pressure in the cylinder in the case where the fuel injection at an early stage in a compression stroke (i.e. at stage A) is effected, while the broken line shows a variation of the pressure in the case where the fuel injection at an early stage in a compression stroke is not effected (i.e. a pressure variation in the case where fuel is injected only at stage B). In FIG. 4, stage B corresponds to the stage at which main fuel injection is effected.

As per the above, when the cetane number of fuel is to be determined in the state in which the fuel actually used for running an internal combustion engine, the cetane number of the fuel is determined based on a change in the pressure in the combustion chamber or an ignition delay time etc. upon combustion of the fuel injected into the combustion chamber while the internal combustion engine is running.

Other methods of determining the cetane number of fuel are disclosed, for example, in Japanese Patent Application Laid-Open No. 3-105042, Japanese Patent Application Laid-Open No. 5-223026 and Japanese Patent Application Laid-Open No. 5-172699.

DISCLOSURE OF THE INVENTION

The cetane number of the fuel determined based on a change in the pressure in the combustion chamber or an ignition delay time etc. upon combustion of fuel injected into the combustion chamber while the internal combustion engine is running is liable to be influenced by the condition of the combustion chamber upon injection of the fuel into the combustion chamber. Accordingly, there is a risk that the determined cetane number can differ depending on the running condition of the internal combustion engine even if fuel with the same cetane number is injected actually.

An object of the present invention is to provide a technology that enables to determine the cetane number of fuel in a state in which it is actually used for running an internal combustion engine with a higher degree of accuracy.

According to a first aspect of the present invention that attains the above object, a small quantity of fuel is injected into the combustion chamber while the internal combustion engine is in a fuel cut state, and the cetane number of the fuel is determined based on the time that elapses until the fuel is ignited.

More specifically, an method of determining the cetane number of fuel in an internal combustion engine according to the present invention is characterized by performing fuel injection for cetane number determination in which a specified quantity of fuel is injected into a combustion chamber during a compression stroke or a expansion stroke while the internal combustion engine is in a fuel cut state, and determining the cetane number of the fuel based on a time period from a specified time to a time of ignition at which the fuel injected by the fuel injection for cetane number determination is ignited.

Here, the fuel cut state refers to the state in which a process of suspending normal fuel injection performed in accordance with the load of the internal combustion engine, so-called fuel cut, is being performed. When an internal combustion engine is in a fuel cut state, influence of the running condition of the internal combustion engine on the condition of the combustion chamber is small. Accordingly, the combustion chamber is in a more stable state than while normal fuel injection is being performed.

In the present invention, the fuel injection for cetane number determination, in which a specified quantity of fuel is injected into the combustion chamber during a compression stroke or expansion stroke, is performed while the internal combustion engine is in a fuel cut state. The fuel injected by the fuel injection for cetane number determination is burned while the combustion chamber is in a more stable state. Thus, the time period from the specified time to the time of ignition at which the fuel is ignited becomes more dependent on the cetane number of the fuel. Moreover, while the internal combustion engine is in a fuel cut state, the temperature of the combustion chamber is lower than while normal fuel injection is being performed. Accordingly, influence of the cetane number of fuel on the time of ignition of the fuel injected by the fuel injection for cetane number determination becomes larger.

As per the above, according to the present invention, it is possible to determine the cetane number of fuel in a state in which it is actually used for running an internal combustion engine, with a higher degree of accuracy.

Here, the specified time may be the time at which fuel is injected by the fuel injection for cetane number determination, and the cetane number of the fuel may be determined based on a so-called ignition delay time. Alternatively, a time at which the piston is at the top dead center or the bottom dead center may be designated as the specified time.

The specified fuel quantity is not changed in accordance with the load of the internal combustion engine unlike with the fuel injection quantity in normal fuel injection; the specified fuel quantity is such an quantity that a change in the torque of the internal combustion engine upon combustion of the specified quantity of fuel in the combustion chamber falls within an allowable range.

By controlling the specified fuel quantity as above, it is possible to suppress deterioration in drivability due to combustion of the specified quantity of fuel.

When the fuel injected is ignited, the quantity of heat generated in the combustion chamber increases. In view of this, in the present invention, a generated heat quantity parameter that has a correlation with the quantity of heat generated in the combustion chamber of the internal combustion engine may be derived. In connection with this, the time at which the generated heat quantity parameter starts to increase may be regarded as the time at which the fuel injected by the fuel injection for cetane number determination is ignited on condition that an increase in the generated heat quantity parameter after performing the fuel injection for cetane number determination is larger than or equal to a specified increase amount.

Here, the specified increase amount is such an amount that if the generated heat quantity parameter increases by that amount, it can be considered that the increase is caused by fuel combustion. The specified increase amount may be determined in advance.

According to a second aspect of the present invention, a small quantity of fuel is injected into a combustion chamber while an internal combustion engine is in a fuel cut state, and the cetane number of the fuel is determined based on a change, upon ignition of the fuel, in a generated heat quantity parameter that has a correlation with the quantity of heat generated in the combustion chamber.

More specifically, a method of determining the cetane number of fuel in an internal combustion engine according to the present invention is characterized by deriving a generated heat quantity parameter having a correlation with a quantity of heat generated in a combustion chamber of an internal combustion engine, performing fuel injection for cetane number determination in which a specified quantity of fuel is injected into a combustion chamber during a compression stroke or a expansion stroke while the internal combustion engine is in a fuel cut state, and determining the cetane number of the fuel based on a rate of increase in the generated heat quantity parameter upon ignition of the fuel injected by the fuel injection for cetane number determination.

The higher the cetane number of the fuel injected into the combustion chamber is, the easier the fuel is to ignite, and therefore, the shorter the ignition delay time is. Accordingly, when the fuel is ignited, the quantity of heat generated per unit time becomes smaller. Consequently, the increase in the generated heat quantity parameter per unit time, or the increase rate of the generated heat quantity parameter becomes smaller. This means that the cetane number of the fuel can be determined based on the increase rate of the generated heat quantity parameter at the time when the generated heat quantity parameter starts to increase upon ignition of the fuel injected into the combustion chamber.

As described before, the fuel injected by the fuel injection for cetane number determination, which is performed while the internal combustion is in a fuel cut state, is burned when the combustion chamber is in a more stable state. Thus, the increase rate of the generated heat quantity parameter upon ignition of the fuel becomes more dependent on the cetane number of the fuel. Moreover, while the internal combustion engine is in a fuel cut state, the temperature of the combustion chamber is lower than while normal fuel injection is being performed. Accordingly, influence of the cetane number of fuel on the increase rate of the generated heat quantity parameter upon ignition of the fuel injected by the fuel injection for cetane number determination becomes larger.

As per the above, according to the present invention, it is possible to determine the cetane number of fuel in a state in which it is actually used for running an internal combustion engine, with a higher degree of accuracy, as with the first aspect of the present invention.

As with the above case, the specified fuel quantity in this case is also not changed in accordance with the load of the internal combustion engine unlike with the fuel injection quantity in normal fuel injection, and the specified fuel quantity is such an quantity that a change in the torque of the internal combustion engine upon combustion of the specified quantity of fuel in the combustion chamber falls within an allowable range.

In the first and second aspects of the present invention, the generated heat quantity parameter may be derived based on an output value of a sensor that detects a physical quantity that changes with a change in the quantity of heat generated in the combustion chamber. In this case, the aforementioned specified fuel quantity is such an quantity that a change in the torque of the internal combustion engine upon combustion of the specified quantity of fuel falls within an allowable range, and that the peak value of the increase in the generated heat quantity parameter upon ignition of the specified quantity of fuel in the combustion chamber is larger than the peak value of the increase in the generated heat quantity parameter that is derived while fuel is not burned in said combustion chamber, caused by noise in the output value of said sensor.

In the case where the generated heat quantity parameter is derived based on an output value of the sensor, the generated heat quantity parameter can change due to noise included in the sensor output value. This means that the generated heat quantity parameter can rise even if there is no actual increase in the generated heat quantity.

In view of this, the specified fuel quantity is set in the above-described manner. By this feature, it is possible to discriminate whether an increase in the generated heat quantity parameter is caused by noise or fuel combustion. Consequently, it is possible to detect ignition of the fuel injected by the fuel injection for cetane number determination while restricting changes in the torque of the internal combustion engine.

In the first and second aspects of the present invention, timing of performing the fuel injection for cetane number determination may be set in such a way that the fuel injected by the fuel injection for cetane number determination is ignited in the latter half of the expansion stroke.

By performing the fuel injection for cetane number determination with such timing, it is possible to restrict changes in the torque of the internal combustion engine caused by combustion of the fuel injected by the fuel injection for cetane number determination more.

In the first and second aspects of the present invention, when the fuel injection for cetane number determination is to be performed, the quantity of intake air flowing into the combustion chamber may be reduced to smaller than or equal to a specified intake air quantity.

When the intake air quantity is made smaller, combustion of fuel in the combustion chamber becomes harder, and differences in ignition characteristics depending on the cetane number are enhanced accordingly. Therefore, by controlling the intake air quantity as per the above, it is possible to determine the cetane number with a higher degree of accuracy.

Here, the specified intake air quantity may be an air quantity as small as possible, but with which the fuel injected by fuel injection for cetane number determination can be burned.

In the first and second aspects of the present invention, the fuel injection for cetane number determination may be performed simultaneously with a fuel cutting operation, or performed after a specified time has elapsed since a fuel cutting operation.

The longer the time that has elapsed after fuel cut is, the smaller influences of the running condition of the internal combustion engine before performing the fuel cut on the condition of the combustion chamber is. Therefore, by controlling the time of performing the fuel injection for cetane number determination in the above-described manner, it is possible to reduce variations in the condition of the combustion chamber when the fuel injected by the fuel injection for cetane number determination is burned. Thus, it is possible to determine the cetane number of fuel with a higher degree of accuracy.

In connection with this, the specified time mentioned here is such a time that after the specified time has elapsed it may be considered that influences of the running state of the internal combustion engine before fuel cut was performed (i.e. while normal fuel injection was performed) on the condition in the combustion chamber have become sufficiently small.

In the first and second aspects of the present invention, in the case where the internal combustion engine has a plurality of cylinders, the cetane number of fuel may be determined by performing the fuel injection for cetane number determination only in any one of the cylinders.

In the case where there are a plurality of cylinders, if the fuel injection for cetane number determination is performed in every cylinder, an increase in the torque of the internal combustion engine caused by combustion of the fuel injected by the fuel injection for cetane number determination can become large.

In view of this, the fuel injection for cetane number determination is performed only in any one of the cylinders. By this feature, it is possible to restrict increases in the torque of the internal combustion engine.

In addition, with the above feature, if an apparatus for detecting fuel ignition is to be provided for cylinders, the apparatus may be provided for only any one of the cylinders.

In the first and second aspects of the present invention, if the internal combustion engine is further equipped with pressure detection means for detecting the pressure in the combustion chamber and volume detection means for detecting the volume of the combustion chamber, the generated heat quantity parameter may be derived based on the pressure P in the combustion chamber detected by the pressure detection means and the volume V of the combustion chamber detected by the volume detection means.

From the pressure P in the combustion chamber and the volume V of the combustion chamber, it is possible to derive a parameter that has a higher correlation with the heat quantity generated in the combustion chamber using the relationship formulated by the state equation PV=nRT (where P: pressure, V: volume, n: number of mols, R: gas constant (J/mol·K), and T: temperature (K)). Thus it is possible to determine the cetane number of the fuel with a higher degree of accuracy by deriving a generated heat quantity parameter having a higher correlation with the quantity of heat generated in the combustion chamber and determining the cetane number of the fuel using this generated heat quantity parameter.

In the first and second aspects of the present invention, the product $PV^\kappa$ of the pressure P in the combustion chamber detected by the pressure detection means and the κ-th power of the volume V of the combustion chamber detected by the volume detection means may be used as the generated heat quantity parameter, where κ is a constant close to the specific heat ratio of the air fuel mixture in the combustion chamber.

It is known from the above-mentioned state equation PV=nRT that $PV^\kappa$ is constant through an adiabatic change. Accordingly, the change in $PV^\kappa$ upon combustion of fuel in the combustion chamber depends on the energy generated by the combustion. This means that $PV^\kappa$ has a higher correlation with the quantity of heat generated in the combustion chamber. Therefore, it is possible to determine the cetane number of the fuel with a higher degree of accuracy by determining the cetane number of the fuel using $PV^\kappa$ as the generated heat quantity parameter.

In connection with this, the constant κ may be of a value in the neighborhood of the specific heat ratio of air fuel mixture formed in the combustion chamber. The constant κ may be determined in advance. In addition, the constant κ may be changed in accordance with the intake air quantity or the fuel injection quantity etc.

The generated heat quantity parameter may alternatively be the value $\Delta PV$ obtained by subtracting the product (which will be referred to as PVbase hereinafter) of the pressure P' in the combustion chamber and the volume V' of the combustion chamber in the case in which the piston only moves without combustion occurring in the combustion chamber from the product (which will be referred to as PVre hereinafter) of the pressure P in the combustion chamber detected by the pressure detection means and the volume V of the combustion chamber detected by the volume detection means at the same crank angle.

When fuel combustion occurs in the combustion chamber, the value of PVre is indicative of the sum of the energy generated by the fuel combustion and the energy generated by compression by the piston. On the other hand, the value of PVbase is indicative of the energy generated by compression by the piston. Accordingly, the value $\Delta PV$ obtained by subtracting PVbase from PVre at the same crank angle is a value having a higher correlation with the quantity of heat generated in the combustion chamber. Therefore, it is possible to determine the cetane number of the fuel with a higher degree of accuracy by determining the cetane number of the fuel using $\Delta PV$ as a generated heat quantity parameter.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

In the following, a specific embodiment of the method of determining the cetane number of fuel in an internal combustion engine according to the present will be described with reference to the drawings.

Figure 1:
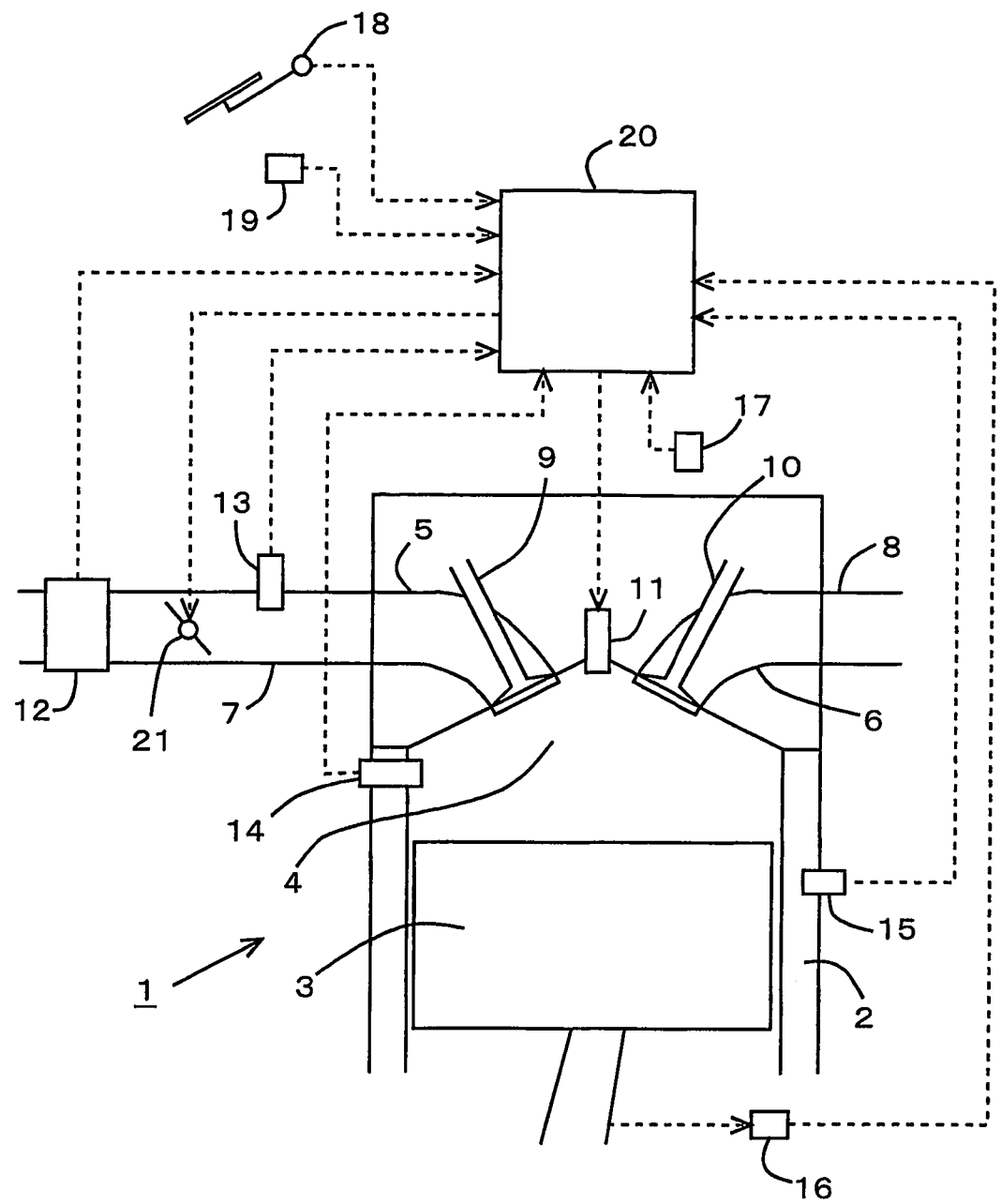
FIG. 1 schematically shows the basic structure of an internal combustion engine and its intake and exhaust systems according to an embodiment of the present invention.

The following description will be directed to a case in which the present invention is applied to a diesel engine for driving a vehicle by way of example. FIG. 1 schematically shows the basic structure of an internal combustion engine according to this embodiment and its intake and exhaust systems.

The internal combustion engine 1 has a cylinder 2, in which a piston 3 slidable therein is provided. In the combustion chamber 4 in the upper portion of the cylinder 2, there opens an intake port 5 and an exhaust port 6. The intake port 5 is connected with an intake passage 7, and the exhaust port 6 is connected with an exhaust passage 8. In the intake passage 7, a throttle valve 21 is provided.

The openings of the intake port 5 and the exhaust port 6 to the combustion chamber 4 are opened and closed by an intake valve 9 and an exhaust valve 10 respectively. A fuel injection valve 11 for injecting fuel into the interior of the combustion chamber 4 is protruding into the combustion chamber 4.

In the intake passage 7, there is provided an air flow meter 12 that outputs an electric signal indicative of the quantity of the intake air flowing in the intake passage 7 and an intake air temperature sensor 13 that outputs an electric signal indicative of the temperature of the intake air flowing in the intake passage 7. Furthermore, the internal combustion engine 1 is equipped with an in-cylinder pressure sensor 14 that outputs an electric signal indicative of the pressure in the interior of the combustion chamber 4, a water temperature sensor 15 that outputs an electric signal indicative of the temperature of cooling water in a water jacket of the internal combustion engine 1, a crank position sensor 16 that outputs an electric signal indicative of the rotational angle of the crankshaft that is linked with the piston 3 by means of a con-rod and a fuel temperature sensor 17 that outputs an electric signal indicative of the temperature of the fuel injected through the fuel injection valve 11, the fuel temperature sensor 17 being provided in a fuel supply system for supplying fuel to the fuel injection valve 11.

To the internal combustion engine 1 having the above-described structure, an ECU 20 for controlling the internal combustion engine 1 is annexed. The ECU 20 is a unit for controlling the running state of the internal combustion engine 1 in accordance with running conditions of the internal combustion engine 1 or driver's demands. The ECU 20 is connected with various sensors such as the air flow meter 12, the intake air temperature sensor 13, the in-cylinder pressure sensor 14, the water temperature sensor 15, the crank position sensor 16, an accelerator position sensor 18 that outputs an electric signal indicative of the accelerator position, an atmospheric pressure sensor 19 that outputs an electric signal indicative of the atmospheric pressure via electric wiring. The output signals from the various sensors are input to the ECU 20. The crank position sensor 16 is adapted to output a signal every time the crankshaft rotates by 10 degrees in CA.

The ECU 20 is also electrically connected with the fuel injection valve 11 and the throttle valve 21 so that the valves are controlled by the ECU 20. For example, while the internal combustion engine 1 is running, normal fuel injection from the fuel injection valve 11 is effected in accordance with the load of the internal combustion engine 1 derived from an output value of the accelerator position sensor 18. Thus, when no load is applied on the internal combustion engine 1 as is the case during deceleration, fuel cut is performed.

In this embodiment, the ECU 20 is adapted to calculate value $PV^\kappa$ as the generated heat quantity parameter, where $PV^\kappa$ is the product of the pressure P in the interior of the combustion chamber 4 detected by the in-cylinder pressure sensor 14 and the κ-th power of the volume V of the combustion chamber 4 calculated from the detection value of the crank position sensor 16, κ being a constant close to the specific heat ratio of air fuel mixture. The constant κ may be, for example, the specific heat ratio of oxygen, that is 1.4. The ECU 20 calculates the generated heat quantity parameter $PV^\kappa$ every time the signal from the crank position sensor 16 is output a specified number of times. For example, the generated heat quantity parameter $PV^\kappa$ may be calculated every time a signal is output from the crank position sensor 16.

Figure 2:
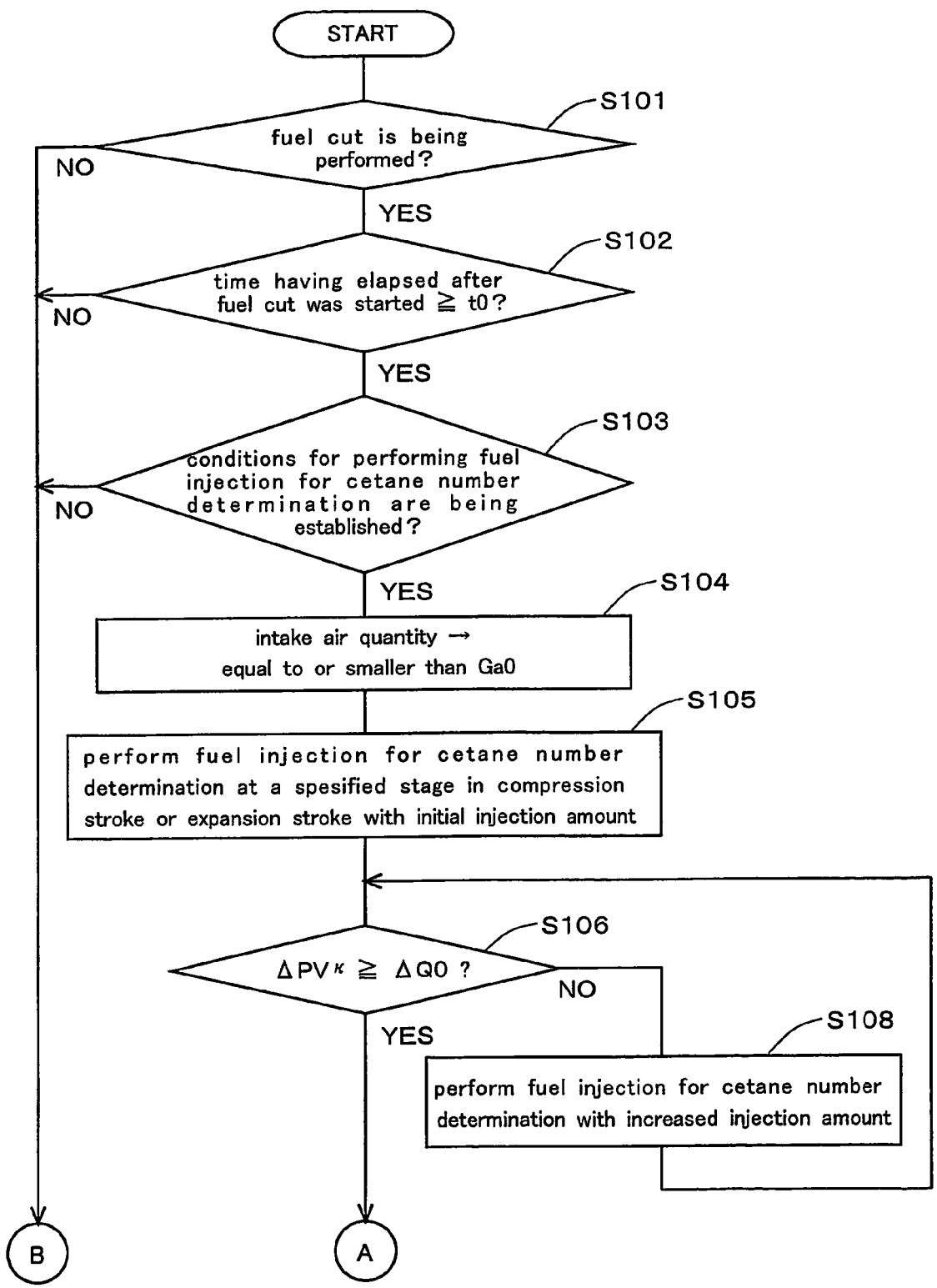
FIG. 2 is a flow chart of the first half of a control routine in determining the cetane number of fuel according to the embodiment of the present invention.
Figure 3:
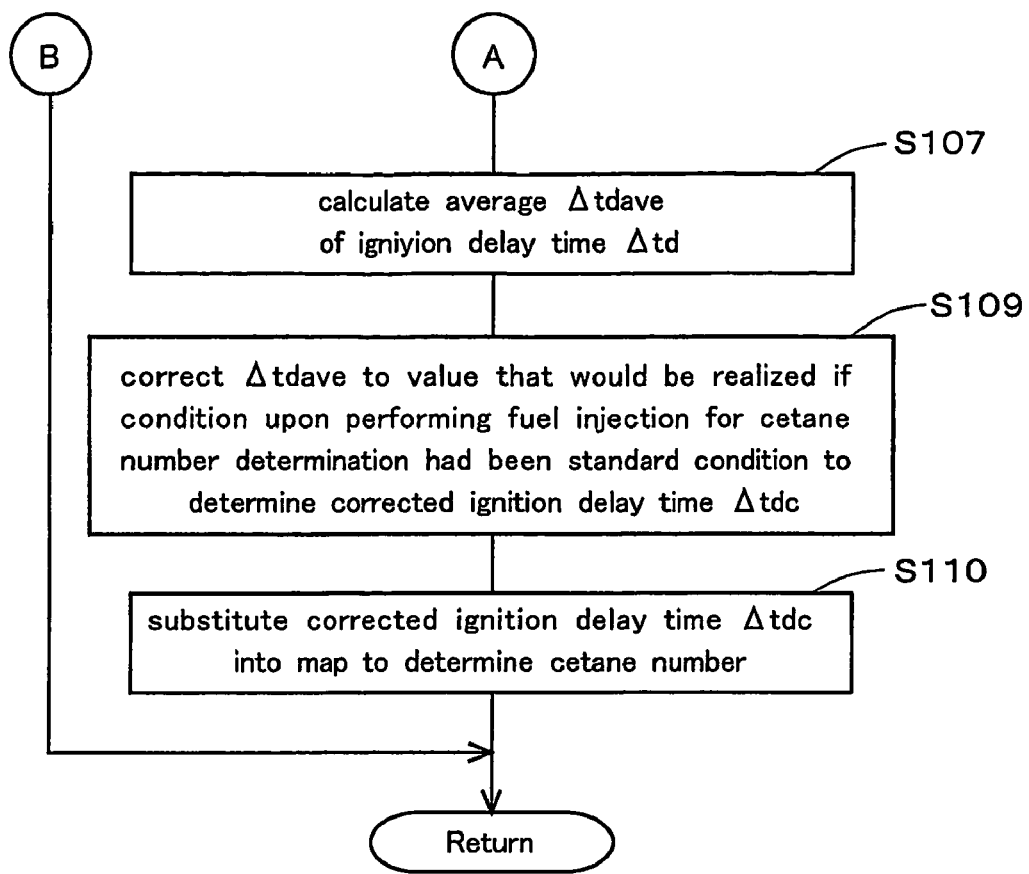
FIG. 3 is a flow chart of the second half of the control routine in determining the cetane number of fuel according to the embodiment of the present invention.
Figure 4:
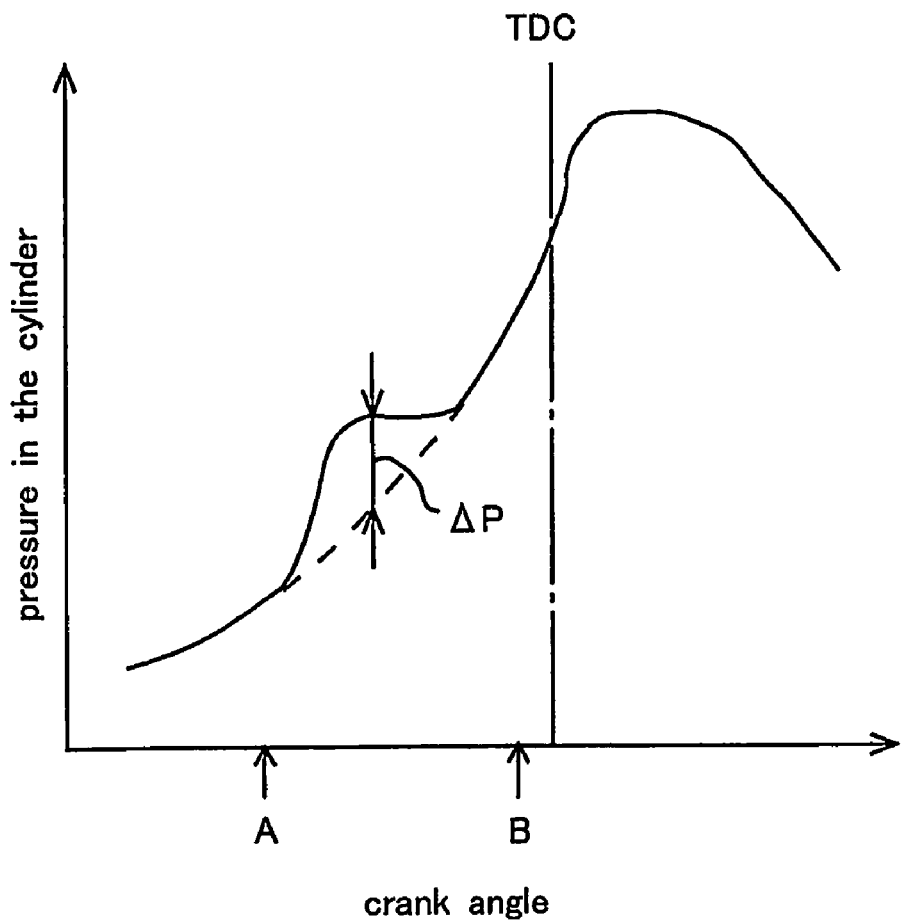
FIG. 4 is a graph showing changes in the pressure in a combustion chamber in a case where fuel combustion occurs in the combustion chamber and in a case where fuel combustion does not occur in the combustion chamber.

Next, a control routine in determining the cetane number of fuel according to this embodiment will be described with reference to flow charts shown in FIGS. 2 and 3. This routine is stored in the ECU 20 in advance and executed at specified time intervals. Alternatively, this routine may be executed, for example, every time the internal combustion engine has revolved a specified number of times, every time the vehicle has traveled a specified distance, or upon every refueling.

In this routine, firstly in step S101, a determination is made by the ECU 20 as to whether or not fuel cut is being performed in the internal combustion engine 1. If step S101 is answered in the affirmative, the process of the ECU 20 proceeds to step S102, and if step S101 is answered in the negative, the ECU terminates execution of this routine.

In step S102, a determination is made by the ECU 20 as to whether or not the time that has elapsed since the fuel cut was started (in other words, since the normal fuel injection was stopped) is equal to or longer than a specified time t0. In connection with this, the specified time t0 is such a time that after the specified time t0 has elapsed, it may be considered that influences of the running state of the internal combustion engine 1 before fuel cut was performed (i.e. while normal fuel injection was performed) on the condition in the combustion chamber 4 have become sufficiently small. The time t0 is determined in advance by, for example, experiments. If step S102 is answered in the affirmative, the process of the ECU 20 proceeds to step S103, and if step S102 is answered in the negative, the ECU 20 terminates execution of this routine.

In step S103 a determination is made by the ECU 20 as to conditions for performing fuel injection for determining the cetane number is currently established. The conditions may include, for example, that the number of engine revolutions of the internal combustion engine is within a specified revolution number range (for example, equal to or more than 1500 rpm and less than 3000 rpm), that the temperature of the intake air detected by the intake air temperature sensor 13 is within the specified temperature range (for example, equal to or higher than 40° C. and lower than 80° C.), that the temperature of the cooling water detected by the water temperature sensor 15 is within a specified water temperature range (for example, equal to or higher than 85° C. and lower than 95° C.), that the temperature of fuel detected by a fuel temperature sensor 17 is within a specified fuel temperature range (for example, equal to or higher than 40° C. and lower than 60° C.), and that the atmospheric pressure detected by the atmospheric pressure sensor 19 is higher than a specified atmospheric pressure (for example, 95 kPa). In order for the cetane number to be determined frequently, it is necessary that the above conditions are common conditions while the internal combustion engine 1 is running.

If step S103 is answered in the affirmative, the process of the ECU 20 proceeds to step S104, and if step S103 is answered in the negative, the ECU 20 terminates execution of this routine.

In step S104, the ECU 20 controls to reduce the opening of the throttle valve 21 to make the intake air quantity lower than or equal to a specified intake air quantity Ga0. It is preferred that the specified intake air quantity Ga0 be an air quantity as small as possible, but with which the fuel injected by fuel injection for cetane number determination can be burned. The specified intake air quantity Ga0 is determined in advance by, for example, experiments.

Next, the process of the ECU 20 proceeds to step S105, in which fuel injection valve 11 is controlled so that fuel injection for cetane number determination will be performed at a specified stage in a compression stroke or an expansion stroke. The quantity of the fuel injected in this process is a predetermined initial injection quantity.

Here, the initial injection quantity is such an injection quantity that a change in the torque of the internal combustion engine upon combustion of the injected fuel falls within an allowable range. The initial injection quantity is determined in advance by, for example, experiments. It is preferred that the aforementioned specific time be such a time that the fuel injected by the fuel injection for cetane number determination will be ignited in the latter half of the expansion stroke. By performing the fuel injection for cetane number determination at such a time, an increase in the torque of the internal combustion engine caused by combustion of the injected fuel can be reduced.

Next, the process of the ECU 20 proceeds to step S106, in which a determination is made as to whether or not the generated heat quantity parameter $PV^\kappa$ has increased after the fuel injection for cetane number determination and there has been a time during which the peak value $\Delta PV^\kappa$ of its increase was equal to or larger than a specified increase amount $\Delta Q0$.

In this embodiment, the generated heat quantity parameter $PV^\kappa$ is calculated based on the pressure P in the interior of the combustion chamber 4 detected by the in-cylinder pressure sensor 14 and the volume V of the combustion chamber 4 calculated based on the detection value of the crank position sensor 16. However, values output from the in-cylinder sensor 14 and the crank position sensor 16 contain noise, and accordingly $PV^\kappa$ may change due to the noise even if there is no actual change in the quantity of heat generated in the combustion chamber 4. Accordingly, if the change in the quantity of heat generated in the combustion chamber 4 caused by combustion of the fuel injected by the fuel injection for cetane number determination is small, it may sometimes be difficult to determine whether the increase in $PV^\kappa$ was caused by combustion of fuel or the noise in the output values of the sensors 14 and 16.

In view of the above, here the peak value $\Delta PV^\kappa$ of the increase in $PV^\kappa$ after fuel injection for cetane number determination was performed is calculated, and a determination is made as to whether there has been a time during which the value $\Delta PV^\kappa$ was equal to or larger than the specific increase amount $\Delta Q0$ that has been determined in advance. Here, the specified increase amount $\Delta Q0$ is such a threshold value that if the peak value $\Delta PV^\kappa$ of the increase in $PV^\kappa$ is equal to or larger than the specified increase amount $\Delta Q0$, it may be considered that the increase in $PV^\kappa$ is caused not by noise but by fuel combustion. The specified increase amount $\Delta Q0$ is determined in advance by, for example, experiments.

If step S106 is answered in the affirmative, it is possible to detect the time at which $PV^\kappa$ started to increase due to combustion of the fuel injected by the fuel injection for cetane number determination. In other words, it is possible to detect the time at which the fuel was ignited. In this case, the process of the ECU 20 proceeds to step S107.

On the other hand, if step S106 is answered in the negative, it is difficult, at that time, to detect the time at which the fuel injected by the fuel injection for cetane number determination was ignited. Accordingly, the process of the ECU 20 proceeds to step S108, in which fuel injection for cetane number determination is performed again with an increased injection quantity. The timing of performing the fuel injection for cetane number determination is the same as the performing timing in step S105.

When fuel injection for cetane number determination is performed with an increased injection quantity in step S108, the increase in $PV^\kappa$ caused by combustion of the injected fuel becomes larger. After that, the process of the ECU 20 returns to step S106. By repeatedly executing steps S106 and S108, the fuel quantity injected by the fuel injection for cetane number determination is gradually increased until the value $\Delta PV^\kappa$ exceeds the specified increase amount $\Delta Q0$. In connection with this, even if the injection quantity in the fuel injection for cetane number determination is increased, the injection quantity shall be set within such a range that a change in the torque of the internal combustion engine 1 upon combustion of the injected fuel falls within an allowable range.

In step S107, the ECU 20 derives ignition delay time $\Delta td$ after the fuel injection for cetane number determination, wherein the time at which $PV^\kappa$ started to increase is regarded as the time at which the ignition occurred, on condition that $\Delta PV^\kappa$ has increased by an amount equal to or larger than the specified increase amount $\Delta Q0$. The calculation of $\Delta td$ is repeatedly performed a predetermined number of times to determine the average $\Delta tdave$ of them.

Next, the process of the ECU 20 proceeds to step S109, where the ECU 20 corrects $\Delta tdave$ to a value that would be realized if the condition upon performing the fuel injection for cetane number determination had been a standard condition to determine a corrected ignition delay time $\Delta tdc$.

This correction is to be performed for the following reason. Each of those conditions for performing the fuel injection for cetane number determination establishment of which is determined in step S103 has a certain breadth of range. On the other hand, in step S110 that will be described later, a map describing the relationship between the ignition delay time and the cetane number is used to determine the cetane number based on the ignition delay time. This map describes the relationship between the ignition delay time and the cetane number in the case where the fuel injection for cetane number determination is performed under a certain specific condition. Thus, the specific condition under which the relationship between the ignition delay time and the cetane value described in the aforementioned map holds is set as the standard condition, and $\Delta tdave$ is corrected to a value that would be realized if the condition upon performing the fuel injection for cetane number determination based on which $\Delta tdave$ was derived had been the standard condition.

In connection with this, changes in the ignition delay time with deviations of a condition among the conditions for performing the fuel injection for cetane measurement (such as the number of engine revolutions, cooling water temperature, intake air temperature, intake air quantity, atmospheric pressure, and fuel temperature) from the standard condition may be determined in advance by, for example, experiments and the relationship between the deviation from the standard condition and the change in the ignition delay time may be stored as a map so that Δtdave may be corrected by this map.

Next, the process of the ECU 20 proceeds to step S110, where the ECU 20 substitutes the corrected ignition delay time Δtdc into the aforementioned map stored in advance that describes the relationship between the ignition delay time and the cetane number to determine the cetane number.

In the above-described control routine, the cetane number of fuel is determined based on the ignition delay time of the fuel that is injected into the combustion chamber 4 while the internal combustion engine 1 is in a fuel cut state, namely in a state in which the condition in the combustion chamber 4 is relatively stable and the temperature in the combustion chamber 4 is lower than while fuel injection is normally performed. In other words, the cetane number of fuel is determined based on the ignition delay time in a state in which dependency of the ignition delay time on the cetane number of the fuel is relatively high.

Therefore, according to this embodiment, it is possible to determine the cetane number of fuel in a state in which it is actually used for running the internal combustion engine 1 with a higher degree of accuracy.

Moreover, since the fuel injection for cetane number determination is performed after a specified time t0 has elapsed since the fuel cut was effected, variations in the condition in the combustion chamber 4 upon combustion of the fuel thus injected can be reduced. This means that determination of the cetane number based on the ignition delay time can be performed with a higher degree of accuracy.

Furthermore, by performing fuel injection for cetane number determination with an intake air quantity smaller than or equal to the specified intake air quantity Ga0, differences in ignition characteristics depending on the cetane number can be enhanced.

According to this embodiment, the injection quantity in fuel injection for cetane number determination is set to such a quantity that the change in the torque of the internal combustion engine caused by combustion of the injected fuel falls within an allowably range and the increase $\Delta PV^\kappa$ in the heat generation quantity parameter $PV^\kappa$ becomes lager than or equal to the specified increase amount $\Delta Q$. By this feature, it is possible to detect ignition of the fuel injected by fuel injection for cetane number determination with a higher degree of accuracy while restricting changes in the torque of the internal combustion engine 1.

Furthermore, according to this embodiment, the ignition delay time is determined based on the change in $PV^\kappa$ that has a high correlation with the heat quantity generated by combustion of fuel in the combustion chamber 4. Therefore, it is possible to determine the ignition delay time with a higher degree of accuracy and to determine the cetane number of the fuel with a higher degree of accuracy accordingly.

In this embodiment, the cetane number of injected fuel may be determined based on the rate of increase $dPV^\kappa/d\theta$ upon ignition of the fuel after the fuel injection for cetane number determination.

As described before, the time at which $PV^\kappa$ started to increase may be considered to be the time at which fuel was ignited on condition that the increase in $PV^\kappa$ after fuel injection for cetane number determination was larger than or equal to $\Delta Q$. In connection with this, the higher the cetane number of the fuel is, the lower the value of $dPV^\kappa/d\theta$ at the time at which $PV^\kappa$ starts to increase is. Therefore, it is possible to determine the cetane number of the fuel based on the value of $dPV^\kappa/d\theta$ at that time.

In this case, the relationship between $dPV^\kappa/d\theta$ and the cetane number may be determined in advance by, for example, experiments, and the relationship may be stored in the ECU 20 as a map. The cetane number may be determined by substituting the value of $dPV^\kappa/d\theta$ at the time at which the fuel injected by fuel injection for cetane number determination is ignited into the map. In this case also, a condition under which the relationship between $dPV^\kappa/d\theta$ and the cetane value described in the map holds is set as a standard condition in a similar manner as the case of the ignition delay time, and $dPV^\kappa/d\theta$ is corrected to a value that would be realized if the condition upon performing the fuel injection for cetane number determination for which $dPV^\kappa/d\theta$ was determined had been the standard condition. Then the corrected value of $dPV^\kappa/d\theta$ is substituted into the map to determine the cetane number.

In the case where the internal combustion engine 1 is an multi-cylinder engine having a plurality of cylinders 2, the cetane number may be determined by performing the fuel injection for cetane number determination only for any one of the cylinders. In this case, an increase in the torque of the internal combustion engine caused by combustion of the fuel injected by the fuel injection for cetane number determination can be made small as compared to the case in which the fuel injection for cetane number determination is performed for multiple cylinders. The in-cylinder pressure sensor 14 may be provided only one of the cylinders.

Next a modification will be described. In this modification, the product of the pressure P in the combustion chamber 4 detected by the in-cylinder pressure sensor 14 and the volume V of the combustion chamber 4 calculated based on the value detected by the crank position sensor 16 is referred to as PVre. The product of the pressure P' in the combustion chamber 4 and the volume V' of the combustion chamber 4 in the case in which the piston 3 only moves without combustion occurring in the combustion chamber 4 is referred to as PVbase. Thus, the cetane number of fuel is determined using a value $\Delta PV$ obtained by subtracting PVbase from PVre at the same angle as the generated heat quantity parameter instead of $PV^\kappa$.

When combustion is not occurring in the combustion chamber 4, PVre and PVbase are of the same value. But when fuel is burned in the combustion chamber 4, the value of PVre becomes a value indicative of the sum of the energy generated by the fuel combustion and the energy generated by compression by the piston 3. On the other hand, the value of PVbase is indicative of the energy generated by compression by the piston 3. Therefore, the value $\Delta PV$ obtained by subtracting PVbase from PVre at the same crank angle is a value indicative of the energy generated by the fuel combustion.

As per the above, since $\Delta PV$ also has a high correlation with the quantity of heat generated in the combustion chamber 4 as with $PV^\kappa$ mentioned above, changes in $\Delta PV$ caused by fuel combustion in the combustion chamber are very similar to changes in $PV^\kappa$. Therefore, it is possible to determine the cetane number of fuel injected into the combustion chamber 4 with a higher degree of accuracy by using $\Delta PV$ as the generated heat quantity parameter based on the method same as the method using $PV^\kappa$ as the generated heat quantity parameter.

In this case, PVbase may be determined in advance by, for example, experiments and stored in the ECU 20.

While the invention has been described in terms of preferred embodiments, those skilled in the art will recognize that the invention can be practiced with modifications within the spirit and scope of the appended claims.

INDUSTRIAL APPLICABILITY

According to the method of determining the cetane number of fuel in the internal combustion engine, it is possible to determine the cetane number of fuel in a state in which it is used for running the internal combustion engine with a higher degree of accuracy.

The invention claimed is:

1. A method of determining the cetane number of fuel in an internal combustion engine, comprising:
   performing fuel injection for cetane number determination in which a specified quantity of fuel is injected into a combustion chamber during a compression stroke or a expansion stroke while the internal combustion engine is in a fuel cut state; and
   determining the cetane number of the fuel based on a time period from a specified time to a time of ignition at which the fuel injected by the fuel injection for cetane number determination is ignited.

2. A method of determining the cetane number of fuel in an internal combustion engine according to claim 1 further comprising:
   deriving a generated heat quantity parameter having a correlation with a quantity of heat generated in the combustion chamber of said internal combustion engine,
   wherein said time of ignition is set to a time at which said generated heat quantity parameter starts to increase on condition that an increase in said generated heat quantity parameter after performing said fuel injection for cetane number determination is larger than or equal to a specified increase amount.

3. A method of determining the cetane number of fuel in an internal combustion engine according to claim 2, wherein in the case in which said generated heat quantity parameter is derived based on an output value of a sensor that detects a physical quantity that changes with a change in a quantity of heat generated in said combustion chamber, said specified fuel quantity is such an quantity that a change in the torque of the internal combustion engine upon combustion of the specified quantity of fuel falls within an allowable range, and that the peak value of an increase in said generated heat quantity parameter upon ignition of the specified quantity of fuel in said combustion chamber is larger than the peak value of an increase in said generated heat quantity parameter that is derived while fuel is not burned in said combustion chamber, caused by noise in the output value of said sensor.

4. A method of determining the cetane number of fuel in an internal combustion engine according to claim 2, wherein said internal combustion engine further comprises pressure detection means for detecting the pressure in said combustion chamber and volume detection means for detecting the volume of said combustion chamber, wherein said generated heat quantity parameter is derived based on the pressure P in said combustion chamber detected by said pressure detection means and the volume V of the combustion chamber detected by said volume detection means.

5. A method of determining the cetane number of fuel in an internal combustion engine according to claim 4, wherein said generated heat quantity parameter is $PV^\kappa$, which represents the product of the pressure P in said combustion chamber detected by said pressure detection means and the $\kappa$-th power of the volume V of said combustion chamber detected by said volume detection means.

6. A method of determining the cetane number of fuel in an internal combustion engine according to claim 4, wherein said generated heat quantity parameter is $\Delta PV$, which represents a value obtained by subtracting the product of the pressure P' in said combustion chamber and the volume V' of said combustion chamber in the case in which the piston only moves without combustion occurring in the combustion chamber from the product of the pressure P in said combustion chamber detected by said pressure detection means and the volume V of said combustion chamber detected by said volume detection means at the same crank angle.

7. A method of determining the cetane number of fuel in an internal combustion engine according to claim 1, wherein timing of performing said fuel injection for cetane number determination is set in such a way that the fuel injected by the fuel injection for cetane number determination is ignited in the latter half of the expansion stroke.

8. A method of determining the cetane number of fuel in an internal combustion engine according to claim 1, wherein when said fuel injection for cetane number determination is to be performed, the quantity of intake air flowing into said combustion chamber is reduced to smaller than or equal to a specified intake air quantity.

9. A method of determining the cetane number of fuel in an internal combustion engine according to claim 1, wherein said fuel injection for cetane number determination is performed after a specified time has elapsed since fuel cut was effected in said internal combustion engine.

10. A method of determining the cetane number of fuel in an internal combustion engine according to claim 1, wherein said internal combustion engine comprises a plurality of cylinders, and the cetane number of fuel is determined by performing said fuel injection for cetane number determination only in any one of the cylinders.

11. A method of determining the cetane number of fuel in an internal combustion engine comprising:
   deriving a generated heat quantity parameter having a correlation with a quantity of heat generated in a combustion chamber of an internal combustion engine,
   performing fuel injection for cetane number determination in which a specified quantity of fuel is injected into a combustion chamber during a compression stroke or a expansion stroke while the internal combustion engine is in a fuel cut state; and
   determining the cetane number of the fuel based on a rate of increase in said generated heat quantity parameter upon ignition of the fuel injected by the fuel injection for cetane number determination.

12. A method of determining the cetane number of fuel in an internal combustion engine according to claim 11, wherein in the case in which said generated heat quantity parameter is derived based on an output value of a sensor that detects a physical quantity that changes with a change in a quantity of heat generated in said combustion chamber, said specified fuel quantity is such an quantity that a change in the torque of the internal combustion engine upon combustion of the specified quantity of fuel falls within an allowable range, and that the peak value of an increase in said generated heat quantity parameter upon ignition of the specified quantity of fuel in said combustion chamber is larger than the peak value of an increase in said generated heat quantity parameter that is derived while fuel is not burned in said combustion chamber, caused by noise in the output value of said sensor.

13. A method of determining the cetane number of fuel in an internal combustion engine according to claim 11, wherein timing of performing said fuel injection for cetane number determination is set in such a way that the fuel injected by the fuel injection for cetane number determination is ignited in the latter half of the expansion stroke.

14. A method of determining the cetane number of fuel in an internal combustion engine according to claim 11, wherein when said fuel injection for cetane number determination is to be performed, the quantity of intake air flowing into said combustion chamber is reduced to smaller than or equal to a specified intake air quantity.

15. A method of determining the cetane number of fuel in an internal combustion engine according to claim 11, wherein said fuel injection for cetane number determination is performed after a specified time has elapsed since fuel cut was effected in said internal combustion engine.

16. A method of determining the cetane number of fuel in an internal combustion engine according to claim 11, wherein said internal combustion engine comprises a plurality of cylinders, and the cetane number of fuel is determined by performing said fuel injection for cetane number determination only in any one of the cylinders.

17. A method of determining the cetane number of fuel in an internal combustion engine according to claim 11, wherein said internal combustion engine further comprises pressure detection means for detecting the pressure in said combustion chamber and volume detection means for detecting the volume of said combustion chamber, wherein said generated heat quantity parameter is derived based on the pressure P in said combustion chamber detected by said pressure detection means and the volume V of the combustion chamber detected by said volume detection means.

* * * * *